(12) United States Patent
Belpanno et al.

(10) Patent No.: US 7,946,204 B2
(45) Date of Patent: May 24, 2011

(54) LUBRICATION SYSTEM FOR A MULTI-SPINDLE AUTOMATIC SCREW MACHINE

(75) Inventors: Sandro G. Belpanno, Rochester, NY (US); James Hugick, Rochester, NY (US)

(73) Assignee: Brinkman Products, Inc., Rochester, NY (US)

( * ) Notice: Subject to any disclaimer, the term of this patent is extended or adjusted under 35 U.S.C. 154(b) by 1341 days.

(21) Appl. No.: 11/300,193

(22) Filed: Dec. 14, 2005

(65) Prior Publication Data

US 2007/0144317 A1    Jun. 28, 2007

(51) Int. Cl.
*B23B 19/02* (2006.01)
*B23B 13/04* (2006.01)
*F16N 7/36* (2006.01)
*F16N 7/00* (2006.01)

(52) U.S. Cl. .............. 82/129; 82/110; 82/147; 184/6.14

(58) Field of Classification Search ..................... 82/121, 82/129, 147, 110, 117, 142; 384/322, 397; 184/6.14, 5; 29/38 B, 27 C
See application file for complete search history.

(56) References Cited

U.S. PATENT DOCUMENTS

| | | | |
|---|---|---|---|
| 1,125,031 A | | 6/1915 | Chace |
| 2,245,105 A | | 6/1941 | Johnson |
| 2,379,944 A | | 7/1945 | Willmott |
| 2,522,735 A | * | 9/1950 | Zagar ................................. 74/63 |
| 2,625,448 A | * | 1/1953 | Underwood ................... 384/291 |
| 2,728,414 A | * | 12/1955 | Drissner ....................... 184/6.14 |
| 3,351,392 A | | 11/1967 | Powell |
| 4,068,740 A | | 1/1978 | Quinn |
| 4,254,614 A | * | 3/1981 | Miyamoto et al. .............. 57/406 |
| 4,258,598 A | * | 3/1981 | Hoffmann ........................ 82/162 |
| 4,290,610 A | * | 9/1981 | Lizogub et al. ................ 277/417 |
| 4,344,507 A | | 8/1982 | Osborne |
| 4,422,654 A | | 12/1983 | Grunig |
| 4,905,794 A | * | 3/1990 | Sugioka et al. .............. 184/6.15 |
| 5,205,376 A | * | 4/1993 | Nowak .......................... 184/6.14 |
| 6,000,499 A | * | 12/1999 | Nowak et al. ................. 184/6.14 |
| 6,666,581 B1 | | 12/2003 | Boyer |

FOREIGN PATENT DOCUMENTS

CA    473189 A    4/1951

OTHER PUBLICATIONS

International Search Report and Written Opinion on Patentability in PCT/US06/47660.

* cited by examiner

*Primary Examiner* — Boyer D Ashley
*Assistant Examiner* — Sara Addisu
(74) *Attorney, Agent, or Firm* — Phillips Lytle LLP

(57) ABSTRACT

An automatic screw machine (20) has a body (22), and a head (21) that is rotatably mounted on the body and that is adapted to be selectively rotated relative to the body between any of a plurality of index positions. The body and head have closely-spaced and facing bearing surfaces (25, 28 and 26, 29), have spindles (23) journalled on the head for rotation relative thereto, and have a source of pressurized lubricant. The improvement broadly includes: at least one body passageway (32) communicating the source with the body bearing surface, the intersection of each body passageway with the body bearing surface defining a body port (33); a head passageway (36) communicating the head bearing surface with the spindle, the intersection of said head passageway with said head bearing surface defining at least one head port (42); and the body and head passageways being so configured and arranged such that lubricant may flow from the source to the spindle only when the head is in the vicinity of the index position such that the body and head ports overlap one another.

16 Claims, 2 Drawing Sheets

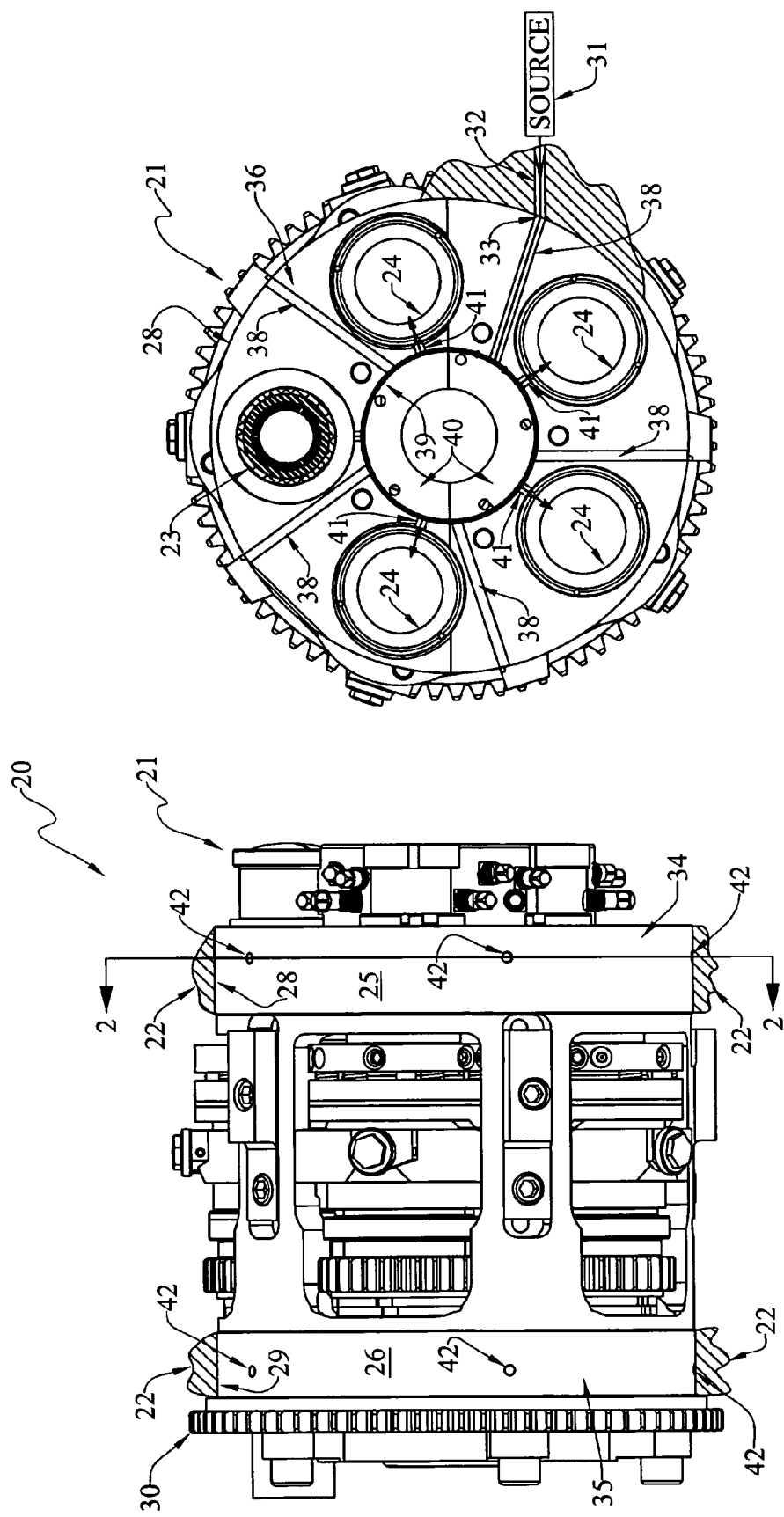

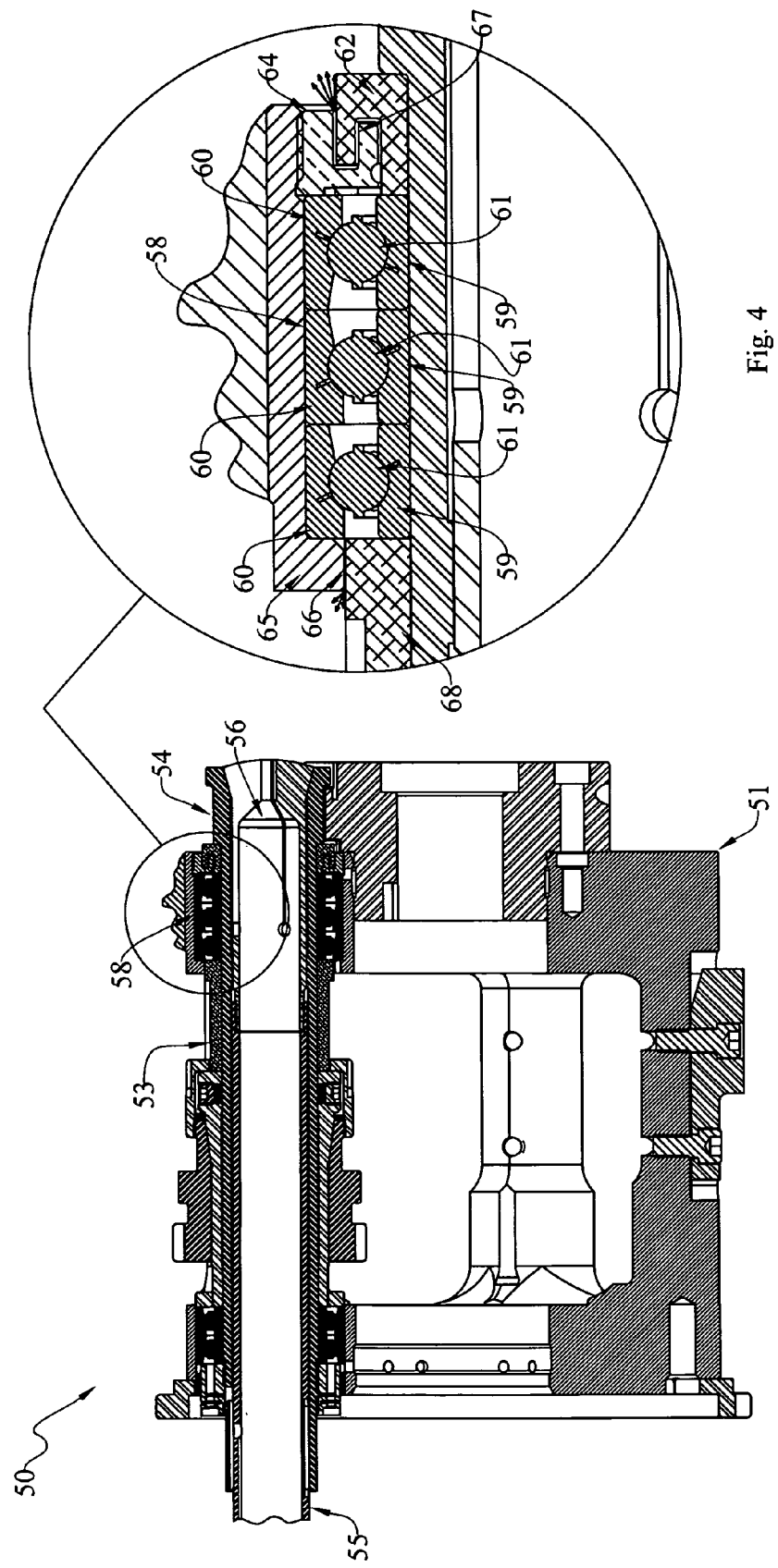

LUBRICATION SYSTEM FOR A MULTI-SPINDLE AUTOMATIC SCREW MACHINE

TECHNICAL FIELD

The present invention relates generally to lubrication systems for multi-spindle screw machines, and, more particularly, to an improved lubrication system that is particularly adapted for use with a Model B Davenport® five-spindle automatic screw machine.

BACKGROUND ART

The terms "machine tool" and "screw machine" are used to describe two different items of machinery. These two types are similar in that they are used to effect a machining operation on a workpiece. They differ in that, in the machine tool, the tool is rotated relative to a stationary workpiece; whereas, in a screw machine, the workpiece is held in a rotatable spindle.

Some automatic screw machines have a plurality of workpiece-holding spindles journalled at circularly-spaced locations on a head, which is itself, in turn, rotatably mounted on a stationary body. In some of these machines, five such spindles are journalled on the head. Thus, the head may be rotatably indexed relative to the body between any of five separate index positions to position a rotating workpiece held in the spindle relative to one or more tools at that particular index station. However, it is necessary to provide a means for lubricating the head-mounted spindles.

U.S. Pat. No. 5,205,376 discloses a lubrication system for an automatic screw machine having a multi-spindle head rotatably mounted on a body. As shown in the '376 patent, annular grooves (indicated at 30, 32 in the '376 patent) extend inwardly from bearing surfaces (indicated at 26, 28, respectively) provided on the head. Passageways are provided through the body and communicate with the annular chamber formed by these head grooves and the facing body bearing surface. A plurality of passageways extend radially into the head from various locations along the groove, and communicate with the holes provided in the head in which the spindles are journalled. Thus, the lubricant flow path is from the external source through the body passageway and into the annular chamber surrounding the head, and from there via radial passageways in the head to the various spindle openings therein.

While the '376 patent does disclose an operable and functional lubrication system, it also has its problems. For example, by machining the annular lubrication groove into the head from a bearing surface, the remaining area of available bearing surface is reduced. In a region that is already prone to wear, the effective area between the head and body bearing surfaces maybe reduced by as much as about 25% because of the provision of this lubrication groove.

Second, the annular groove provides a long path for potential lubricant leakage. In some devices (e.g., the Davenport® Model B), the head bearing surface has a diameter of about 8.75 inches. Hence, the circumference (i.e., $C=\pi d$) is about 27.5 inches. Since the groove is positively pressurized relative to the atmosphere, and since there are potential leakage paths on both sides of the groove, the total length of the potential leakage path is about 55.0 inches. Thus, the '376 patent has a large path of potential lubricant leakage.

Third, the heaviest stock removal normally occurs at the two lowermost spindle positions (i.e., those proximate the 7:00 o'clock and 5:00 o'clock positions). In these two positions, the lubricant flow path is down and then up in the '376 patent. This can contribute to a "dry spindle" condition.

Finally, since the head rotates from one index position to another in a fraction of a second, it is believed to be unnecessary to lubricate the spindles continuously at all angular positions of the head relative to the body. Rather, it is thought to be sufficient to lubricate the spindles only when the head is at any of the various index positions. The oil film established at these various positions is virtually unaffected by a fraction-of-a-second travel time from one angular index position to the next. By contrast, in the '376 patent, all five spindles are lubricated simultaneously and continuously at all angular positions of the head relative to the body.

Additional details of prior art lubrication systems may be shown and described in U.S. Pats. Nos. 1,125,031, 2,245,105, 2,379,944, 2,625,448, 2,728,414, 3,351,392, 4,068,740, 4,344,507 and 4,905,794, and in Canadian Pat. No. 473,189.

Accordingly, it would be generally desirable to provide an improved lubrication system for a multi-spindle screw machine that overcomes these problems in the prior art.

DISCLOSURE OF THE INVENTION

With parenthetical reference to the corresponding parts, portions or surfaces of the disclosed embodiment, merely for purposes of illustration and not by way of limitation, the present invention broadly provides an improved lubrication system for use in an automatic screw machine (20) having a body (22), having a head (21) that is rotatably mounted on the body and that is adapted to be selectively rotated relative to the body between any of a plurality of index positions, the body and head having closely-spaced and facing bearing surfaces (25, 28 and 26, 29), having at least one spindle (23) journalled on the head for rotation relative thereto, and having a source (31) of pressurized lubricant.

The improvement broadly comprises: a body passageway (32) communicating the source with the body bearing surface, the intersection of the body passageway with the body bearing surface defining a body port (33); a head passageway (36) communicating the head bearing surface with the spindle, the intersection of the head passageway with the head bearing surface defining a head port (42); and the body and head passageways being so configured and arranged such that lubricant may flow from the source to the spindle only when the head is in the vicinity of the index position such that the body and head ports overlap one another.

The head passageway (36) may include a first passageway (38) communicating with the head port, an arcuate second passageway (39) communicating with the first passage, and a third passageway (41) communicating the second passageway with the spindle.

The head may be annular such that the head bearing surface is an outer surface on the head, and wherein the second passageway (39) is located proximate an inner surface of the head. The second passageway may be annular.

A member (40) maybe arranged within the head, and the second passageway may be formed between the head and member.

The lubricant may include a fluid, such as oil or include a mixture of air and oil.

Five of the spindles may be are journalled on the head at circularly-spaced locations thereabout, such that the position of each spindle defines a separate index position.

In one form, the first passageway (38) is not radial with respect to the head, but the third passageway (41) is radial with respect to the head.

The body may be provided with only one body passageway (32) that communicates the source with the body bearing surface. Alternatively, the body may be provided with multiple body passageways.

In the preferred form, a first number (e.g., five) of spindles are journalled on the head for rotation relative thereto, and the improvement provides a second number (e.g., five) of head passageways for potential lubricant flow from the source to each of the spindles. The first number may be equal to the second number.

The improvement may further include: first and second axially-spaced seals between the spindle and head. One of the seals may be a labyrinth seal (62). A bearing may be arranged adjacent one of the seals, and the seal proximate the bearing is arranged to discharge lubricant toward the bearing.

Accordingly, the general object of the invention is to provide a simplified lubrications system for a multi-spindle screw machine, such as a Davenport® five-spindle automatic screw machine (such machines are available from Davenport Machine Inc., 167 Ames Street, Rochester, N.Y. 14611).

Another object is to provide a simplified lubrication system that minimizes the reduction of effective area between facing bearing surfaces of a head and body.

Another object is to provide a simplified lubrication system that greatly reduces the potential leakage path for lubricant passing between the body and head.

Another object is to provide a simplified lubrication system that facilitates lubricant flow to the spindles in the lowermost index positions, where most heavy machining and stock removal occurs.

Still another object is to provide a simplified lubrication system having pressurized ball bearing cavities such that designed leakage will flush and clear chips form the seal in the vicinity of the work zone.

These and other objects and advantages will become apparent from the foregoing and ongoing written specification, the drawings and the appended claims.

BRIEF DESCRIPTION OF THE DRAWINGS

FIG. 1 is a side elevation of a rotatable head assembly of a Davenport® five-spindle automatic screw machine.

FIG. 2 is a fragmentary vertical sectional view thereof, taken generally on line 2-2 of FIG. 1, showing the five spindle holes in the head assembly and the head lubrication passageways.

FIG. 3 is a fragmentary longitudinal vertical sectional view of another head assembly, showing the details of the spindle in the uppermost or fourth position.

FIG. 4 is an enlarged detail view of the pressurized bearing assembly shown within the indicated circle in FIG. 3.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, the present invention broadly provides a simplified lubrication system for a multi-spindle automatic screw machine, portions of which are generally indicated at 20 in FIG. 1. This screw machine may, for example, be a five-spindle automatic screw machine available from Davenport Machine Inc. Such automatic screw machines are known and are "old", except as described herein. Accordingly, the description of such prior art structure is abbreviated to avoid obfuscating the present invention.

In FIG. 1, screw machine 20 is shown as having a head assembly, generally indicated at 21, that is rotatably mounted on a body, portions of which are indicated at 22.

As best shown in FIG. 2, the head assembly is adapted to carry five rotatable spindles at circularly-spaced locations. These locations are arranged proximate the 7:00 o'clock, 5:00 o'clock, 2:00 o'clock, 12:00 o'clock and 10:00 o'clock positions, and are locations referred to as the first, second, third, fourth and fifth positions, respectively. One spindle is generally indicated at 23. The other four spindles have been omitted from FIG. 2 in the interest of clarity. Accordingly, at these other positions, the head assembly is shown as having a hole 24 in which such a spindle assembly may be operatively mounted.

Adverting now to FIG. 1, the head assembly 21 is shown as including, in pertinent part, outwardly-facing front and rear cylindrical bearing surfaces 25, 26, respectively. These bearing surfaces are adapted to be closely spaced from, and to face, opposing bearing surfaces 28, 29 provided on the body. A large-diameter gear 30 is mounted on the head assembly, and is adapted to engage a suitable mechanism (not shown) mounted on the body, by means of which the head assembly may be selectively rotated relative thereto.

Referring now to FIG. 2, a suitable source of lubricant, indicated at 31, is arranged to supply pressurized lubricant (e.g., oil, and oil-air mixture, etc.) through a body passageway 32 that intersects body bearing surface 28 to form a body port 33. In the preferred form illustrated in FIGS. 1 and 2, the body front and rear portions 34, 35, respectively, are annular members. As best shown in FIG. 2, the head forward portion 34 has a plurality of passageways that aggregate to create a head passageway, collectively indicated at 36. More particularly, this head passageway includes a five circularly-spaced non-radial first passageways 38 that communicate head surface 25 with the in-wardly-facing cylindrical surface 39 of the head forward portion, an annular passageway defined by surface 39 and complimentary members 40 secured thereto so as to define an annular passageway about inner surface 39, and a plurality of radial passageways, severally indicated at 41, communicating the annular passageway 39 with the various spindle openings 24. As shown in FIG. 1, first passageways 38 open on to, and form a series of circumferentially-spaced ports, severally indicated at 42, on bearing surface 25.

Thus, pressurized lubricant from source 31 is supplied via body passageway 32 to the labyrinth of passageways constituting head passageway 36. At each angular index position of the head relative to the body, body port 33 will be aligned with, and will overlap, one of head ports 42. Thus, at each index position of the head, lubricant from source 31 may flow through body passageway 32, through the aligned (i.e., overlapped) body and head ports, to enter a respective one of body passageways 38. Such lubricant will then be communicated to the annular head second passageway 39 about the head inner surface, and will then be distributed outwardly along radial passageways 41 to spindle openings 24.

As indicated above, the body port 33 will align with one of the head ports 42 at each of the five angularly-spaced index positions of the head assembly relative to the body. Since the travel time for the head assembly to rotate from one angular position to the next is only a fraction of a second, the integrity of the oil film on the relatively moving surfaces is, for all practical purposes, unaffected by the brief transit time from one angular index position to another. When the head assembly is in any of the index positions, there is a flow path for lubricant from the source to each of the head holes in which a spindle assembly may be mounted.

The simplified lubrication system disclosed herein affords a number of advantages, particularly when compared with the prior art lubrication system shown in the '376 patent. First, no annular groove extends into head assembly bearing surfaces 25, 26. Hence, there is no substantial reduction in the effective area between facing bearing surfaces 25, 28 and 26, 29, respectively. The only diminution of this area is provided by the five ports 42 that open onto these bearing surface areas. However, this is much less than in the prior art arrangement. Thus, substantially all of the bearing surface area is available.

Secondly, the potential path for leakage of lubricant is substantially reduced. In the prior art arrangement, the potential leakage path was about 55.0 inches. In the improved system, if the body and head ports have nominal diameters on the order of about 0.25 inches, and if there are five head ports per bearing surface, then the potential leakage path is five times the circumference of an individual port [i.e., leakage path=$5C=(5)(0.25)\pi$]. This is to be contrasted with the prior art arrangement in which the leakage path is about $17.5\pi$ [i.e., leakage path=$2C=(2)(8.75)\pi$]. In other words, the aggregate length of the potential leakage path in the improved device is only about 7% of the aggregate potential leakage path in the prior art arrangement [i.e., $(5)(0.25)\pi/(2)(8.75)\pi=7.14\%$].

FIG. 3 is a fragmentary longitudinal vertical sectional view of another form of the improved multi-spindle automatic screw machine. This form of screw machine is generally indicated at 50, and is shown as including a rotatable head assembly, generally indicated at 51, mounted on a body. This head assembly has five circularly-spaced spindle assemblies, one of which is indicated at 53.

The spindle assembly 53 is shown as including an outer spindle 54, an inner spindle 55 which terminates at its rightward end in a workpiece-holding collet 56. A triplex ball bearing assembly, generally indicated at 58, is operatively arranged between the body 52 and the outer spindle. The triplex bearing assembly is shown as having three axially-spaced bearings. Each bearing as an inner race 59, and outer race 60, and a ball 61 captured therebetween. The chambers between the inner and outer races of each bearing communicate with one another, and are supplied with pressurized lubricant from the improved lubrication system.

At the rightward or forward end of the bearing assembly, a leftwardly-facing C-shaped labyrinth seal 62 is arranged between the right end face of the rightwardmost bearing and a leftwardly-facing annular vertical surface 63 on the outer spindle. A rightwardly-facing C-shaped bearing isolator, generally indicated at 64, is threaded into engagement with the inner marginal right end portion of the head 65. The labyrinth seal 62 and the bearing isolator 64 fit interdigitally and define a tortuous S-shaped leakage path, indicated at 67, through which fluid may flow from the bearing chambers to the front end of the bearing assembly.

At its leftward or rear end, an annular passageway 66 is defined between facing surfaces of a spacer 68 and the head assembly 65. The impedance to lubricant flow through this rearwardly-facing passageway 66 is less than the impedance to lubricant flow through the tortuous S-shaped passage 67 at the front end of the bearing assembly. Thus, as the ball-containing chambers are pressurized with lubricant, less lubricant will escape by flowing forwardly through the S-shaped forward passage 67 than will flow rearwardly through rear passageway 66. However, this forward lubricant flow is important because such controlled leakage tends to flush and clear the labyrinth seal of any chips in the vicinity of the workpiece.

Modifications

The present invention contemplates that many changes and modifications may be made. For example, the invention is not limited to use with a Davenport®-type automatic screw machine. Nor is the invention limited to use with a screw machine having five spindles.

The lubricant may be a liquid, such as oil, or may be an oil-air mixture. Other types of lubricants might be used.

In the embodiments shown in FIGS. 1 and 2, there is a single body passageway 32 that communicates the lubricant source with the body port. This has the advantage of minimizing the reduction in the area of the facing bearing surfaces. However, in an alternative arrangement, multiple body passageways and/or multiple body ports might be provided.

Similarly, the head passageway is shown as including a plurality (shown to be five) of first passageways, an annular communicating or distributing passageway and a like plurality of radial passageways communicating the second or annular passageway with the individual spindles. While presently preferred, this arrangement is not invariable and could also be changed.

In the embodiment shown in FIGS. 3 and 4, duplex and triplex bearings are shown between the rear and front portions of the head assembly and the body. However, this is not invariable, and may be changed. In the embodiment shown, it is presently preferred to adjust the impedances of the openings at the front and rear of each bearing assembly so as to provide a lesser flow of chip-clearing lubricant proximate the front of the forward bearing assembly. This too is optional, and may be changed or varied as desired. While a labyrinth seal and seal isolator seem to work well for this purpose, particularly since the relative positions of these elements offers a way of varying the cross-sectional area of the S-shaped opening therebetween, other types of seals and seal retainers may be used.

Therefore, while presently preferred forms of the present invention have been shown and described, and several modifications thereof discussed, persons skilled in this art will readily appreciate that various additional changes and modifications maybe made without departing from the spirit of the invention, as defined and differentiated by the following claims.

What is claimed is:

1. In an automatic screw machine having a body, having a head that is rotatably mounted on said body and that is adapted to be selectively rotated relative to said body to an index position, said body and head having closely-spaced and facing bearing surfaces, having at least one spindle journalled on said head for rotation relative thereto, and having a source of pressurized lubricant, the improvement which comprises:
a body passageway communicating said source with said body bearing surface, the intersection of said body passageway with said body bearing surface defining a body port;

a head passageway communicating said head bearing surface with said spindle, the intersection of said head passageway with said head bearing surface defining a head port; and said body and head passageways being so configured and arranged such that lubricant may flow from said source to said spindle only when said head is in the vicinity of said index position such that said body and head ports overlap one another.

2. The improvement as set forth in claim 1 wherein said head passageway includes a first passageway communicating with said head port, an arcuate second passageway communicating with said first passage, and a third passageway communicating said second passageway with said spindle.

3. The improvement as set forth in claim 2 wherein said head is annular, wherein said head bearing surface is an outer surface on said head, and wherein said second passageway is located proximate an inner surface of said head.

4. The improvement as set forth in claim 3, and further comprising:

a member arranged within said head, and wherein said second passageway is formed between said head and member.

5. The improvement as set forth in claim 2 wherein said second passageway is annular.

6. The improvement as set forth in claim 2 wherein said first passageway is not radial with respect to said head.

7. The improvement as set forth in claim 2 wherein said third passageway is radial with respect to said head.

8. The improvement as set forth in claim 1 wherein said lubricant includes a fluid.

9. The improvement as set forth in claim 8 wherein said lubricant includes a mixture of air and oil.

10. The improvement as set forth in claim 1 wherein five of said spindles are journalled on said head at circularly-spaced locations thereabout, and wherein the position of each spindle defines a separate index position.

11. The improvement as set forth in claim 1 wherein said body is provided with only one body passageway that communicates said source with said body bearing surface.

12. The improvement as set forth in claim 1 wherein a first number of spindles are journalled on said head for rotation relative thereto, and wherein the improvement provides a second number of head passageways for potential lubricant flow from said source to each of said spindles.

13. The improvement as set forth in claim 12 wherein said first number is equal to said second number.

14. The improvement as set forth in claim 1 and further comprising:

first and second axially-spaced seals between said spindle and head.

15. The improvement as set forth in claim 14 wherein one of said seals is a labyrinth seal.

16. The improvement as set forth in claim 14 wherein a bearing is arranged adjacent one of said seals, and the seal proximate said bearing is arranged to discharge lubricant toward said bearing.

* * * * *